Patented Apr. 18, 1944

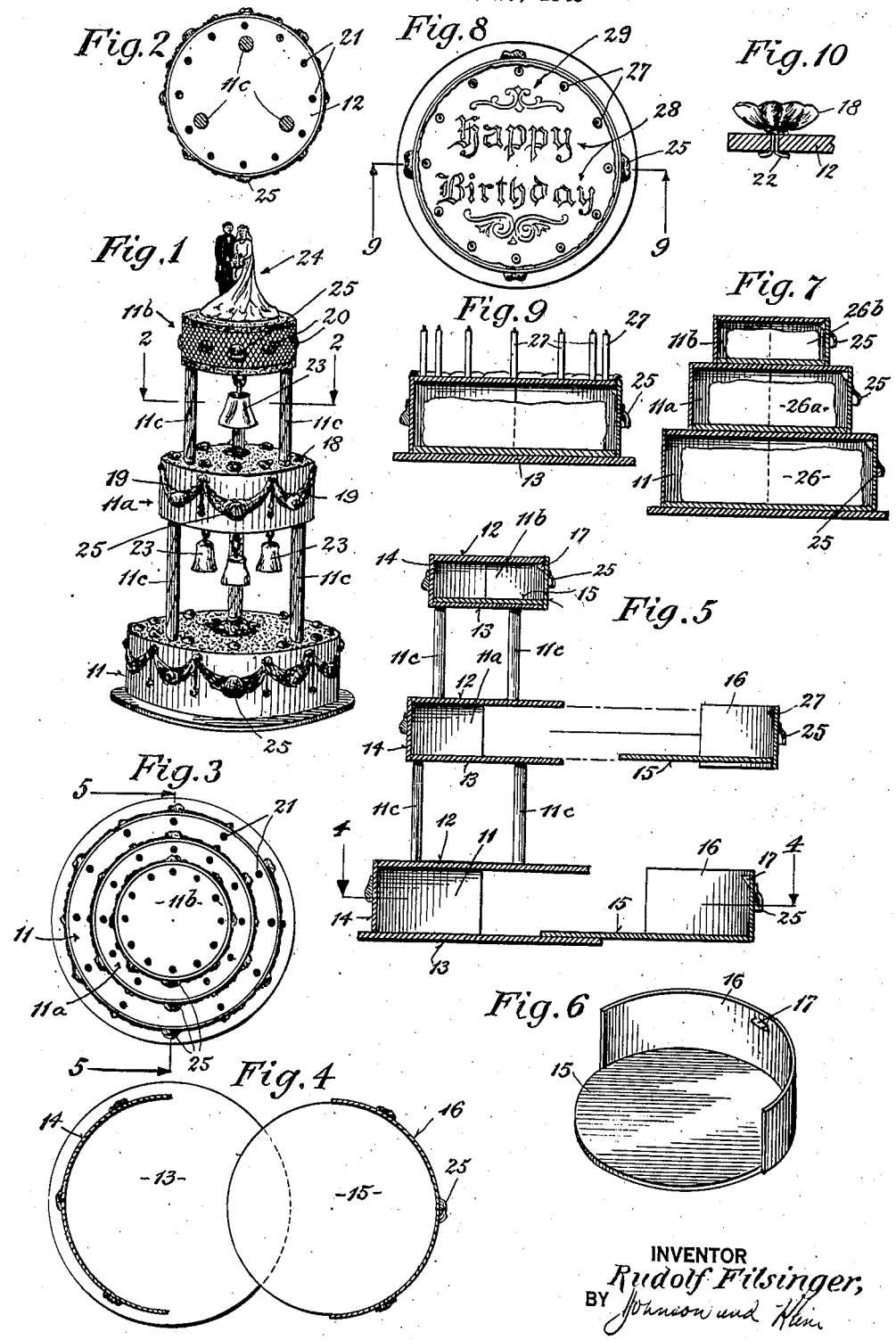

2,347,041

UNITED STATES PATENT OFFICE 2,347,041

ARTIFICIAL CAKE

Rudolf Filsinger, Fairfield, Conn.

Application January 26, 1943, Serial No. 473,629

17 Claims. (Cl. 65—16)

The invention relates to a container for cake or the like having an outward appearance of a frosted cake.

Heretofore, in making wedding, birthday or the like cakes, it has been the practice to apply a sugar frosting to the baked cake and mount or form thereon suitable figures, festoons and decorations. This entails the use of large quantities of sugar and other materials and a considerable amount of time and labor and becomes very expensive. The frosting and decorations so made are usually hard and very sweet and many people do not eat them but discard them prior to eating the cake.

Further, at small wedding parties, it has been impractical to have large and ornate wedding cakes as desired because of the excess amount of cake involved.

These disadvantages have been overcome by the present invention by providing a container or compartment for cake having an outward appearance of a frosted cake and having ornaments thereon as may be required by the occasion.

According to the present invention, one or more of these containers may be incorporated into the finished cake form.

Each container or compartment has a removable portion upon which the unfrosted cake is supported and which may be withdrawn to afford access to the cake for cutting and serving. The container is substantially airtight and aids in preserving the cake until it is used.

The containers may be arranged as required. For example, three containers of graduated size, i. e., gradually diminishing size, may be mounted in vertically spaced relation with tubes or posts therebetween to form an English type wedding cake, or the three containers may be stacked one upon another to form an American type wedding cake. Each of the three containers may be provided with a removable portion so that there is space to store three wedding cakes. However, if the wedding party is to be a small one, the three tiers of containers may be used, but only one container have a cake stored therein of a size to suit the particular gathering.

The containers may have some or all of the ornaments or decorations integral therewith or may be provided with means for removably mounting the ornaments or decorations so that they may be readily changed to suit various occasions.

The container of the present invention is particularly applicable to the use of caterers or bakers who serve many wedding parties or like gatherings, for they, with the same form, can, by mounting suitable decorations thereon, serve a wedding party in the morning and change the decorations and serve an anniversary party or other gathering in the evening. This, of course, will effect a substantial saving in both labor and material, since it is merely necessary to replenish the cake in the compartments for each occasion.

A single compartment, if desired, may be used for birthdays or other occasions in which a single cake is required.

The cake-supporting tray, in addition to forming a removable portion of the container for supporting a cake, will provide a cutting board for the cake to permit the same to be readily cut and served.

Other features and advantages of the invention will be apparent from the specification and claims when considered in connection with the drawing in which:

Figure 1 shows a container in the form of a three-tier English type wedding cake.

Fig. 2 is a horizontal sectional view, taken along line 2—2 of Fig. 1.

Fig. 3 is a top view of the cake container of Fig. 1 with the top ornaments removed.

Fig. 4 is a horizontal sectional view taken along line 4—4 of Fig. 5.

Fig. 5 is a longitudinal sectional view, taken along line 5—5 of Fig. 3, with the ornaments removed.

Fig. 6 is a perspective view of the removable cake-receiving tray.

Fig. 7 shows a container in the form of a three-tiered American style wedding cake with the ornaments removed.

Fig. 8 is a top view of a container in the form of a birthday cake.

Fig. 9 is a sectional view, taken along line 9—9 of Fig. 8.

Fig. 10 is a detailed sectional view showing one means for mounting an ornament on the cake container.

The cake containers of the present invention shown herein by way of illustration are round. However, it is understood that they may be square or of other suitable shapes as required. Further, they may be used in various combinations as desired.

In Figure 1, the present invention is embodied in a three-tier English type wedding cake having three containers 11, 11a, 11b of graduated size and spaced vertically from one another by posts 11c. The structure of the containers is best shown in the sectional view in Fig. 5. It will be seen that each container has a top 12, a bottom 13, and a side wall 14 partly extending about the periphery. Each container also has a cake-receiving tray 15 having a side wall 16 which is a complement of the side wall 14, and, with it, completely encloses the container.

The tray 15 is herein illustrated as being slidably mounted in the container so as to, in effect, form a drawer therein. However, it can be mounted for pivotal or other movement as required.

The side wall 16 of the tray 15 is preferably provided with an abutment 17 inwardly disposed from the top thereof so that it engages under the top plate 12 of the container, when the tray is moved into closed position, as shown in the top container of Fig. 5, and supports the free edge thereof. In a single container cake or where there is no weight or strain on the cover plate, this may be eliminated if desired.

The exterior of the containers are painted or otherwise provided with a surface which simulates a frosting on a cake, and suitable ornaments or decorations are mounted on the containers.

The decorations, such as flowers, sprays or the like 18, garlands 19 or raised designs 20 may be permanently affixed to the containers or formed as a part thereof. However, in the preferred form of the invention these decorations are detachably mounted. This may be done in many ways. In the preferred form, the top of each container is provided with a plurality of small apertures 21. These apertures are very small so as to be practically unnoticed, but are shown in greatly exaggerated size in the top in order that they may show up in the drawing. The decorations are mounted in the apertures by means of pins or other similar fastening means 22 which, as shown in Fig. 10, extend through the apertures to interlock the ornament to the top. Similarly, the sides can be provided with apertures to receive garlands or flowers, if desired.

Suitable ornaments, such as bells 23 or figurines 24, or the like, may be also mounted on the containers as required. When the figurines 24 are removably mounted they may be taken off and given to the bride for a keepsake, as is the usual custom.

The trays may be completely removed from the container, as shown by the middle container and tray in Fig. 5, or the tray can be partially slipped out of the container as shown in the bottom container (see also Fig. 4).

When in closed position, the trays and wall carried thereby fit tightly so that the line of jointure is unnoticeable. If desired, however, the ornamentation can be made to overlie these joints and conceal them. Further the tightness of the joint makes the container substantially airtight so that it aids in keeping the unfrosted cake therein from drying out before being used.

In order that the tray may be readily removed, a handle 25 or suitable grip may be provided on the side wall. It is preferably worked into and forms a part of the design of the decorations on the side of the container.

Fig. 7 shows another form of the invention in which the three containers 11, 11a and 11b are of graduated size to receive cakes 26, 26a and 26b. The containers, here, are mounted directly upon one another to provide an American style wedding cake. It will be noted that the top of one container forms the bottom of the container above. However, if desired, each container may be provided with its own bottom. The containers can be provided with ornaments and decorations in a manner similar to that in Fig. 1.

If desired, a single container of the present invention, as shown in Figs. 8 and 9, may be used for birthdays, anniversaries or other small occasions, and the container provided with the required decorations such as candles 27 and suitable inscriptions 28 and scrolls 29 which may be removably mounted thereon.

The containers may be made of metal, wood, fibrous products, or may be molded from plastics. When molded from plastics, it may be possible to mold the ornamentation directly to the container.

When the invention is embodied in a wedding cake of the type shown in Figs. 1 or 7, the three containers may be filled with cake or only one or two filled with cake if desired. In any case, the bridal party may have the benefit of the appearance of the large, decorated cake without the expense of decorating such a cake.

In the broader aspects of the invention, I am the first to provide a container having the outward appearance of a frosted cake and a cake-receiving tray therein with a portion of the container and the tray removabe to afford access to the cake.

Variations and modications may be made within the scope of this invention and portions of the improvements may be used without others.

I claim:

1. A container simulating a cake or the like comprising a top and bottom and side walls extending therearound; and a cake-receiving tray slidably disposed over the bottom, a portion of the side wall of the container and the tray being slidable therefrom to expose the cake thereon, said top and side walls being provided with an inedible surface to simulate the frosting on a cake.

2. A container simulating a cake or the like comprising a top and bottom and a connecting side wall extending partially therearound; and a cake-receiving tray slidably disposed over the bottom and having a side wall to completely close the container, the tray being slidable therefrom to expose the cake thereon, said top and side walls having an inedible surface to simulate the frosting on the cake and having suitable ornaments thereon.

3. A container simulating a cake or the like comprising a top and bottom and a connecting side wall extending partially therearound; a cake-receiving tray slidably disposed over the bottom and having a side wall to completely close the container, the tray being slidable therefrom to expose the cake thereon, said top and side walls having an inedible surface to simulate the frosting on the cake and having suitable ornaments thereon; and grip means on the tray for removing said tray from the container.

4. A container simulating a cake or the like comprising a top and bottom and connecting side walls extending partially therearound; a cake-receiving tray disposed over the bottom and having side walls to completely close the container, the tray being slidable to expose the cake thereon, said top and side walls having an inedible surface to simulate the frosting on a cake; and means for detachably securing ornaments and decorations thereon.

5. A container simulating a cake or the like comprising a top and bottom and connecting side walls extending partially therearound; a cake-receiving tray disposed over the bottom and having side walls to completely close the container, the tray being slidable to expose the cake thereon, said top and side walls having an inedible surface to simulate the fronting on the cake and having ornament-receiving means thereon; and suitable ornaments disposed in said ornament-receiving means.

6. A container simulating a cake or the like comprising a top and bottom and connecting side walls extending partially therearound; and a cake-receiving tray disposed over the bottom and having side walls to completely close the container, the tray being movable to expose the cake thereon, said top and side walls having an inedible surface to simulate the frosting on a cake and having apertures therein, and decorations and ornaments detachably mounted in said apertures.

7. A container simulating a cake or the like comprising a top and bottom and connecting side walls extending partially therearound; and a cake-receiving tray disposed over the bottom and having side walls to completely close the container, the tray being movable to expose the cake thereon, said top and side walls having an inedible surface to simulate the frosting on a cake and having ornaments and decorations thereon, one of the decorations on the side wall of the tray forming a finger grip for manipulating said tray.

8. A container simulating a cake or the like comprising a top and bottom and connecting side walls extending partially therearound; and a cake-receiving tray disposed over the bottom and having side walls to completely close the container, the tray being slidable to expose the cake thereon, said top and side walls having an inedible surface to simulate the frosting on a cake and suitable ornaments thereon, the top having suitable inscriptions and candle-receiving means thereon.

9. A container simulating a cake or the like comprising a top and bottom and connecting side walls extending partially therearound; and a cake-receiving tray disposed over the bottom and having side walls to completely close and form a substantially airtight container to prevent undue drying of the cake therein, the tray being slidable to expose the cake thereon, said top and side walls having an inedible surface to simulate the frosting on a cake.

10. A container simulating a cake or the like comprising a top and bottom and connecting side walls extending partially therearound; and a cake-receiving tray disposed over the bottom and having side walls to completely close the compartment, the tray being slidable to expose the cake thereon and having a cake-supporting surface to provide a cutting board, said top and side walls having an inedible surface to simulate the frosting on a cake.

11. A container simulating a cake or the like comprising a top and bottom and connecting side walls extending partially therearound; and a cake-receiving tray disposed over the bottom and having side walls to completely close the container, the tray being slidable to expose the cake thereon, the side wall having means to engage the undersurface of the free edge of the top, when in closed relation, to provide a support for the same, said top and side walls having an inedible surface to simulate the frosting on a cake.

12. A container simulating a tiered cake comprising a plurality of containers of graduated size, at least one of said containers having a top and bottom and connecting side walls, and a cake-receiving tray disposed over the bottom, a portion of said side walls and the tray being slidable to expose the cake thereon, said top and side walls of each of said containers having an inedible surface to simulate the frosting on the cake.

13. A container simulating a tiered cake comprising a plurality of cake-shaped compartments of graduated size, at least one of said compartments having a top and bottom and connecting side walls extending partially therearound, and a cake-receiving tray disposed over the bottom and having side walls to completely close the compartment, the tray being slidable to expose the cake thereon, said top and side walls of each of said compartments having an inedible surface to simulate the frosting on the cake.

14. A container simulating a tiered cake comprising a plurality of containers spaced from one another by a post means, each one of said containers having a top and bottom and connecting side walls extending partially therearound, and a cake-receiving tray disposed over the bottom and having side walls to completely close the container, the tray being movable to expose the cake thereon, said top and side walls of each of said containers and the post means having an inedible surface to simulate the frosting on the cake and suitable decorations and ornaments thereon.

15. A container simulating a tiered cake comprising a plurality of containers of graduated size, at least one of said containers having a top and bottom and connecting side walls extending partially therearound, and a cake-receiving tray disposed over the bottom and having side walls to completely close the container, the tray being slidable to expose the cake thereon, said top and side walls of each of said containers having an inedible surface to simulate the frosting on the cake, and means for detachably mounting suitable ornaments thereon.

16. A container simulating a tiered cake comprising a plurality of containers of graduated size, means disposed between said containers for vertically spacing said containers, at least one of said containers having a top and bottom and connecting side walls extending partially therearound, and a cake-receiving tray disposed over the bottom and having side walls to completely close the container, the tray being movable to expose the cake thereon, said top and side walls of each of said compartments having an inedible surface to simulate the frosting on the cake.

17. A container simulating a tiered cake comprising a plurality of containers of graduated size spaced vertically from one another by a post means, at least one of said containers having a top and bottom and connecting side walls extending partially therearound, a cake-receiving tray disposed over the bottom and having side walls to completely close the container, the tray being movable to expose the cake thereon, said top and side walls of each of said containers and the post means having an inedible surface to simulate the frosting on the cake and having suitable decorations thereon, and ornaments disposed on the uppermost container and in the space between said containers.

RUDOLF FILSINGER.